United States Patent [19]
Suh et al.

[11] Patent Number: 5,741,420
[45] Date of Patent: Apr. 21, 1998

[54] DEW FORMING PREVENTION APPARATUS

[75] Inventors: Sang-Wook Suh, Pyungtaek; Jae-Young Jang, Suwon, both of Rep. of Korea

[73] Assignee: Samsung Electronics Co., Ltd., Suwon, Rep. of Korea

[21] Appl. No.: 814,709

[22] Filed: Mar. 11, 1997

[30] Foreign Application Priority Data

Mar. 25, 1996 [KR] Rep. of Korea .................. 96-8151

[51] Int. Cl.[6] .......................... B01D 27/08; B01D 35/30
[52] U.S. Cl. .......................... 210/232; 210/238; 210/248; 210/542; 210/416.3; 210/259; 210/266; 210/258; 220/739
[58] Field of Search ............................. 210/232, 238, 210/248, 542, 416.3, 259, 266, 258; 220/739

[56] References Cited

U.S. PATENT DOCUMENTS

| | | |
|---|---|---|
| 3,710,930 | 1/1973 | Owdom . |
| 4,376,703 | 3/1983 | Krauss . |
| 4,451,368 | 5/1984 | Pandelena . |
| 4,859,320 | 8/1989 | Beall, Jr. . |
| 5,421,223 | 6/1995 | Wanrzyniak . |
| 5,567,311 | 10/1996 | Jang . |

Primary Examiner—Thomas M. Lithgow
Attorney, Agent, or Firm—Burns, Doane, Swecker & Mathis, L.L.P.

[57] ABSTRACT

A water purifier includes a plurality of filter members for purifying fresh water. A first connecting hose supplies fresh water to one of the filter members, and additional connecting hoses conduct fresh water sequentially to the other filter members. Thermal insulators surround at least the first connecting hose and at least one of the filter members to prevent the formation of dew thereon.

2 Claims, 4 Drawing Sheets

DEW FORMING PREVENTION APPARATUS

BACKGROUND OF THE INVENTION

1. Field of the Invention

This invention relates to a dew prevention apparatus of a water purifier, and more particularly to a dew prevention apparatus of a water purifier for preventing dew from forming on a fluid passage in the water purifier.

2. Description of the Prior Art

A conventional water purifier, as shown in FIG. 1 includes a rigid body 100 injection molded from resin, a bracket 110 formed by bending a steel plate and mounted on a frontal upper part of the body 100, a plurality of releasable filtering means 120 mounted side by side on the frontal part of the body 100 by means of the bracket 110, a compression pump 130 mounted at a rear wall of the body 100 at a certain height, a concentrated water control valve 140, a circuit board 150 and a high voltage transformer 160 mounted at a certain height at the rear wall of the body 100, a purified water flow control valve 170 mounted between the filtering means 120 and the compression pump 130 at a rear upper part of the body 100 via the bracket 110 in order to control flow of the purified water, and a purified water storage control valve 180 mounted at a certain height at an upper end of the body 100 in order to detect the hydraulic pressure when the purified water passes through some of the filtering means and is infused into the purified water storage tank (not shown), thereby controlling operation of purifying processes. Art upper lid 190 is mounted at the upper part of the body 100 in order to cover an upper part of the filtering means 120, and a rear lid 300 covers the rear part of the body 100.

The body 100 includes a vertical wall panel 201 having a certain height, an upper horizontal panel 102 and a lower horizontal panel 103 integrally formed at an upper and a lower part of the vertical wall panel 101, and side wall panels 104 having the same width as the upper panel and extending between the vertical wall panel 101 and the upper and lower panel 102 and 103.

Meanwhile, the plurality of filtering means 120 comprise a sediment filter 121 mounted via the bracket 110 for being supplied with the fresh water through a connecting hose 210 and for eliminating floating materials contained in the fresh water including rust, a preprocessing filter 122 mounted via the bracket 110 for being supplied with the fresh water from the sediment filter 121 and for eliminating harmful materials contained in the fresh water including chlorides, a reverse osmosis filter 123 mounted via the bracket 110 for being supplied with the fresh water supplied to the compression pump 130 from the pre-processing filter 122 and for eliminating various heavy metals and cancer-causing materials contained in the fresh water, and a post-processing filter 124 mounted via the bracket 110 for being supplied with the fresh water from the reverse osmosis filter 123 through the connecting hose 210 to eliminate various obnoxious odors and toxic gaseous elements contained in the water.

The operation of the conventional water purifier thus constructed is described as follows:

When a purified water faucet at a sink (not shown) is opened to get purified water from the storage tank, power is applied to the compression pump 130 for activation thereof and, at the same time, fresh water (tap water) sequentially flows according to the hydraulic pressure of a tap water pipe (not shown) through the plurality of filtering means 120 and through a water supplying pipe (not shown) to thereafter be purified.

That is, the fresh water flows into the sediment filter 121 through the fresh water supplying pipe, causing floating materials therein to be eliminated. Then partially purified water flows into the pre-processing filter 122 causing harmful materials to be eliminated. The water, being much more purified now, flows into the compression pump 130 through the connecting hose 210 and then is forced into the reverse osmosis filter 123 so that heavy metals and carcinogens are eliminated.

The purified water from the reverse osmosis filter 123 is stored in the purified water storage tank (not shown) through the connecting hose 210 which is opened by a control signal of the purified water storage control valve 180. At this time, the stored purified water, under pressure in the purified water storage tank, flows into the post-processing filter 124 in response to an opening of the purified water faucet causing obnoxious odors and toxic gaseous elements to be eliminated. The purified water having passed through the post-processing filter 124 is now guided to the purified water faucet through the purified water pipe (not shown), where the purified water is dispensed into the sink (not shown) when the purified water faucet is turned on.

At this time, concentrated waste water generated when the water passes through the reverse osmosis filter 123, is discharged from the water purifier by control of the concentrated water control valve 140 to thereby prevent contamination of the reverse osmosis filter 123 by deposition of the concentrated water during the purifying operation and to prolong the life thereof.

However, there is a problem in the conventional water purifier thus constructed, in that dew is formed on the connecting hoses and the filter means due to a temperature difference between the warm room temperature and the fresh water temperature when the purifier is installed indoors, and the dew gathers on the water purifier to cause water collection and thereby impedes functions of the water purifier.

Accordingly, it is an object of the present invention to provide a dew prevention apparatus for preventing a dew forming phenomenon from occurring on a fluid passage of a water purifier.

It is another object of the present invention to provide a dew prevention apparatus for preventing dew from being formed on of filters of a water purifier.

SUMMARY OF THE INVENTION

In accordance with one object of the present invention, there is provided a water purifier, comprising connecting hoses wrapped by insulators surrounding some or all of the connecting hoses for preventing a dew forming phenomenon.

In accordance with another object of the present invention, there is provided a dew prevention apparatus of a water purifier having filters, the apparatus comprising at least one of the filters wrapped by an insulator for preventing dew from being formed thereon.

BRIEF DESCRIPTION OF THE DRAWINGS

For a fuller understanding of the nature and objects of the invention, reference should be made to the following detailed description taken in conjunction with the accompanying drawings in which.

DESCRIPTION OF A PREFERRED EMBODIMENT

The preferred embodiment of the present invention will now be described in detail with reference to the accompanying drawings.

Figure 1:
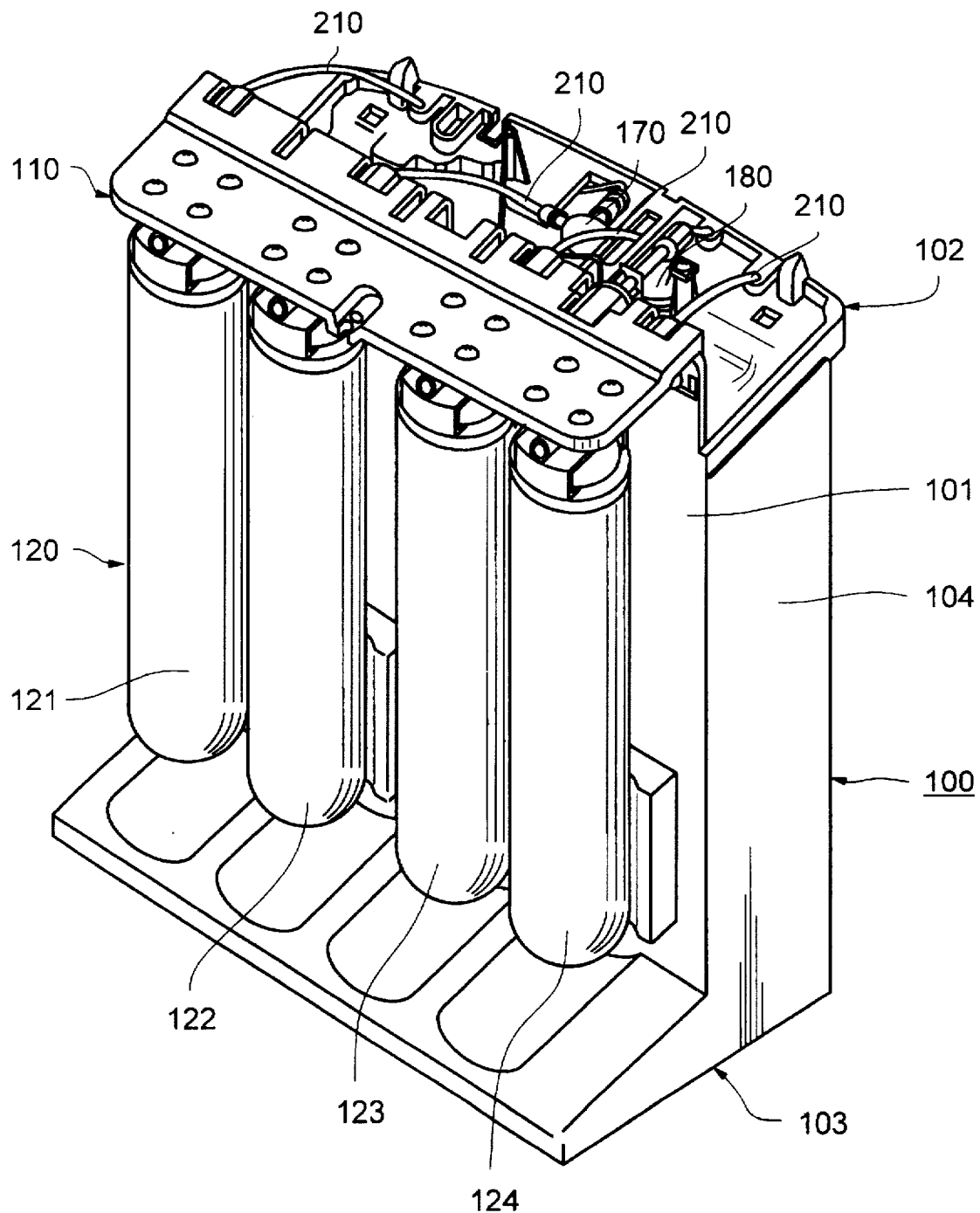
FIG. 1 is a perspective view of a conventional water purifier with an upper lid removed.
Figure 2:
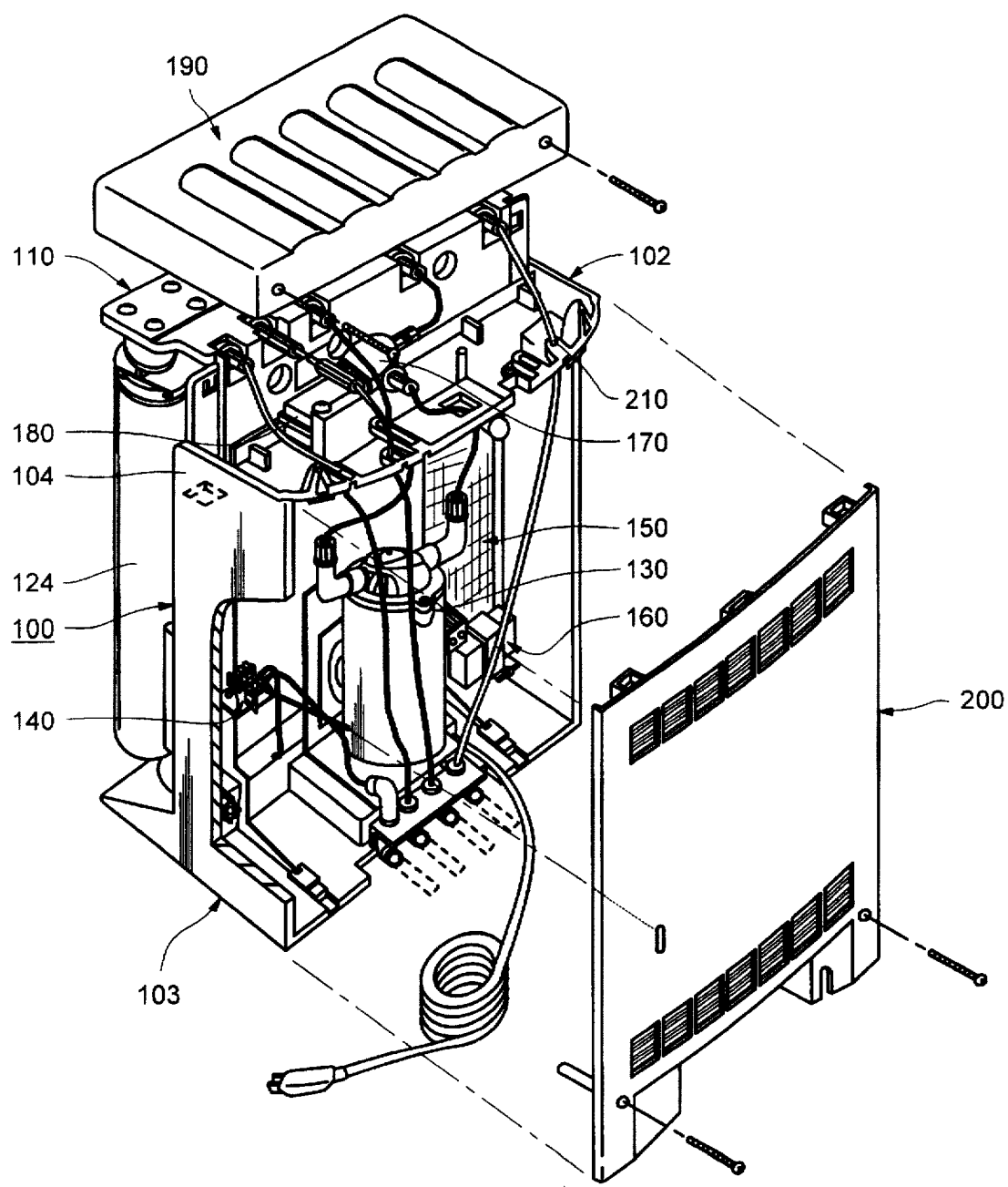
FIG. 2 is a rear perspective view of the conventional water purifier for showing an inner construction thereof.
Figure 3:
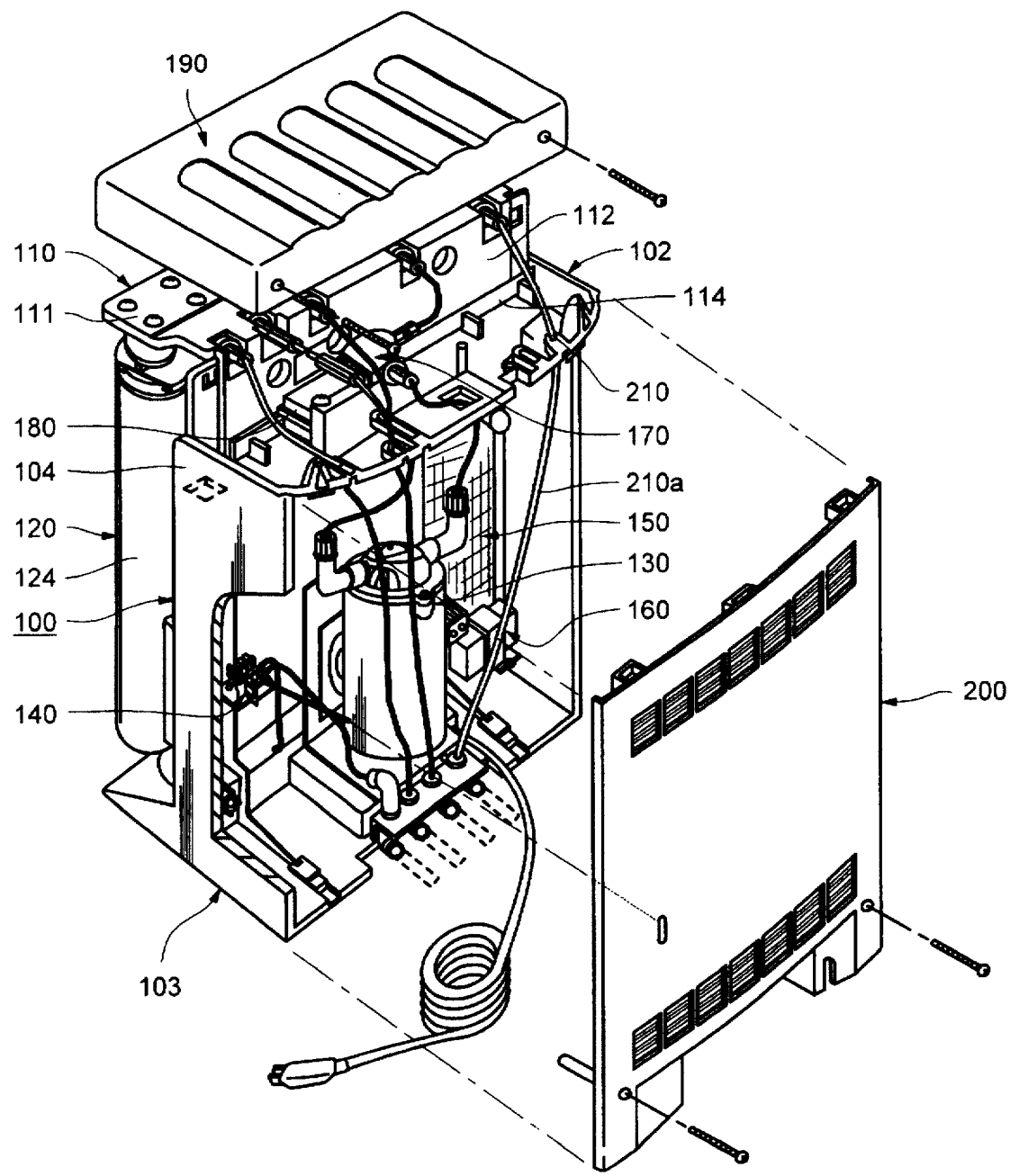
FIG. 3 is an exploded rear perspective view of a water purifier having a dew prevention apparatus according to an embodiment of the present invention.

FIG. 3 is a rear perspective view of the dew forming prevention apparatus of a water purifier according to the embodiment of the present invention.

A water purifier with a dew prevention apparatus according to the present invention, like the above described conventional water purifier, includes a rigid body 100 injection-formed of resin, a bracket 110 formed by bending a steel plate and mounted at a frontal upper part of the body 100, a plurality of releasable filtering means 120 mounted via the bracket 110 in side-by-side relationship, a compression pump 130 mounted at a rear wall of the body 100 at a certain height, a concentrated water control valve 140, a circuit board 150 and a high voltage transformer 160 mounted at a certain height at the rear wall, a purified water flow control valve 170 mounted between the filtering means 120 and the compression pump 130 at a rear upper part of the body 100 via the bracket 110 in order to control flow of the purified water, and a purified water storage control valve 180 mounted at a certain height at the body 100 in order to detect the hydraulic pressure when the purified water passes through some of the filtering means and inflows into the purified water storage tank (not shown) to control the operation of purifying processes. An upper lid 190 is mounted at an upper part of the body 100 in order to cover the upper part of the filtering means 120, and a rear lid 300 covers a rear part of the body 100.

The dew prevention apparatus according to the present invention is an insulator 210a disposed on an outer surface of a partial length of a connecting hose 210 supplying the fresh water, so that dew is prevented from being formed when the temperature of the fresh water incoming to the water purifier is lower than room temperature or when the purifying process is repeatedly continued. FIG. 3 shows a case where the insulator 210a is disposed on a connecting hose 210 through which the fresh water initially flows. However, insulators 210a may be disposed along the entire length of all connecting 210.

Meanwhile, an insulator such as a tube-shaped insulator having a sponge wrapped therearound which is used for preventing a tap water pipe from being frozen in winter time can be utilized.

The body 100 includes a vertical wall panel 201 having a certain height, an upper panel 102 and a lower panel 103 integrally formed at the upper and lower part of the vertical wall panel 101, and side wall panels 104 having the same width as that of the vertical wall panel and extending between the vertical wall panel 101 and the upper and the lower panel 102 and 103.

Figure 4:
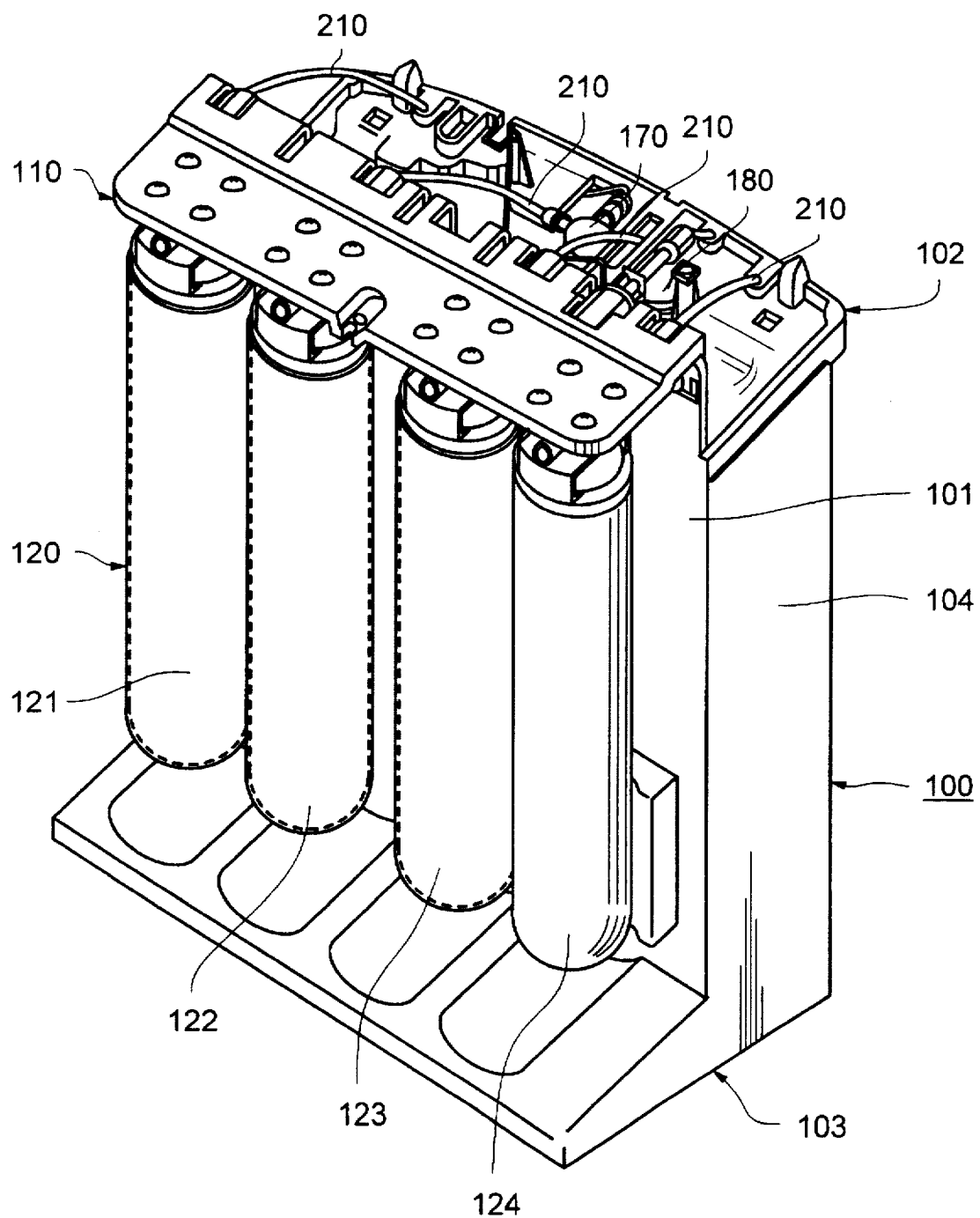
FIG. 4 is a front perspective view of the dew prevention apparatus according to the embodiment of the present invention.

The plurality of filtering means 120, as shown in FIG. 4, comprise a deposition filter 121 mounted via the bracket 110 for being supplied with the fresh water through one of the connecting hoses 210 and for eliminating floating materials contained in the fresh water including rust, a pre-processing filter 122 mounted via the bracket 110 for being supplied with the fresh water from the deposition filter 121 and for eliminating harmful materials contained in the fresh water including chlorides, a reverse osmosis filter 123 mounted via the bracket 110 for being supplied with the fresh water which is supplied to the compression pump 130 from the preprocessing filter 122 and for eliminating various heavy metals and cancer-causing materials contained in the fresh water, and a post-processing filter 124 mounted via the bracket 110 for being supplied with the fresh water from the reverse osmosis filter 123 through the connecting hoses 210 and for absorbing various obnoxious odors and toxic gaseous elements contained in the fresh water.

In the dew prevention apparatus of a water purifier according to the present invention, insulators 121a, 122a and 123a are respectively wrapped around outer walls of the deposition filter 212, the pre-processing filter and the reverse osmosis filter 123 out of the plurality of filter means 120 to thereby prevent dew forming from thereon.

In FIG. 4, the filter means 120 consist of four filters 121, 122, 123 and 124 as described above, but the filter means 120 are not restricted thereto and may consist of only three filters 122, 123 and 124. That is, the deposition filter can be omitted. In the latter case, insulators 122a and 123a are wrapped on the pre-processing filter 122 and the reverse osmosis filter 123. By way of reference, it is desirable that insulators should be disposed on the filter means 120 in due order from a filter means where the fresh water is first infused.

Sponge is desirable for the insulators 121a, 122a and 123a. Nevertheless, depending on circumstances, flexible resin having a heat insulating effect may be used.

When a purified water faucet (not shown) is opened to get purified water, power is applied to the compression pump 130 and, at the same time, the fresh water (tap water) sequentially flows according to the hydraulic pressure of a tap water pipe (not shown) through a plurality of filtering means 120 via a water supplying pipe (not shown) to thereafter be purified with the various harmful materials being eliminated.

In other words, the fresh water flows into the deposition filter 121 through the fresh water supplying pipe, and the fresh water is discharged once the floating materials in the water are removed. Then the partially purified water flows into the pre-processing filter 122 where harmful materials are eliminated. The water, now being much more purified, flows into the compression pump 130 through the connecting hoses 210, and then is forced into the reverse osmosis filter 123 where heavy metals and cancer-causing materials are removed.

Then, the purified water from the reverse osmosis filter 123 is conducted to the purified water storage tank through one of the connecting hoses 210 according to a control signal of the purified water storage control valve 180. At this time the stored purified water of the purified water storage tank flows into and through the post-processing filter 124 by operation of the purified water faucet and compressive pressure in the purified water storage tank, with obnoxious odors and gaseous elements being eliminated. The purified water having passed through the post-processing filter 124 is guided into the purified water faucet through the purified water pipe (not shown), where the purified water is discharged onto the sink (not shown) when the purified water faucet is turned on.

At this time, the concentrated (waste) water generated when the water passes through the reverse osmosis filter 123 is discharged outside of the water purifier by control of the concentrated water control valve 140 to thereby prevent contamination of the reverse osmosis filter 123 by deposition of concentrated water thereon during the purifying operation and to prolong the life thereof.

As apparent from the foregoing, there is an advantage in the dew prevention apparatus of a water purifier according to the present invention thus constructed, in that insulators are wrapped on the outer surfaces of the connecting hoses where the fresh water pass at first and insulators are wrapped on the outer surfaces of the filter means, to therefore avoid the dew forming.

What is claimed is:

1. A water purifier comprising an injection-molded body, a bracket mounted on an upper portion of the body, a plurality of filter members mounted to the bracket, a first connecting hose for supplying fresh water to one of the filter members, additional connecting hoses for conducting fresh water from the first filter member sequentially to other filter members, a pump for pressurizing fresh water supplied to at least one of the filter members, and thermal insulators surrounding at least the first connecting hose and at least one of the filter members to prevent the formation of dew thereon.

2. The water purifier according to claim 1, wherein the thermal insulators are formed of sponge.

* * * * *